US011084441B2

United States Patent
Wee

(10) Patent No.: US 11,084,441 B2
(45) Date of Patent: Aug. 10, 2021

(54) VEHICLE AIRBAG FIRING CONTROL SYSTEM AND AIRBAG FIRING CONTROL METHOD USING THE SAME

(71) Applicants: Hyundai Motor Company, Seoul (KR); Kia Motors Corporation, Seoul (KR)

(72) Inventor: Sung Don Wee, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/018,618

(22) Filed: Jun. 26, 2018

(65) Prior Publication Data

US 2019/0225174 A1  Jul. 25, 2019

(30) Foreign Application Priority Data

Jan. 24, 2018  (KR) .................. 10-2018-0008704

(51) Int. Cl.
*B60R 21/0132* (2006.01)
*B60R 21/0136* (2006.01)
*B60W 50/00* (2006.01)
*B60R 21/01* (2006.01)

(52) U.S. Cl.
CPC .... *B60R 21/01336* (2014.12); *B60R 21/0136* (2013.01); *B60W 50/0098* (2013.01); *B60R 2021/01286* (2013.01); *B60W 2050/0056* (2013.01)

(58) Field of Classification Search
CPC .......... B60R 21/0132; B60R 21/01336; B60R 21/0136; B60R 21/00; B60R 21/01; B60R 21/013
See application file for complete search history.

(56) References Cited

U.S. PATENT DOCUMENTS

| | | | |
|---|---|---|---|
| 4,958,851 A * | 9/1990 | Behr | B60R 21/0176 280/735 |
| 7,040,166 B2 * | 5/2006 | Babala | B60R 21/0132 73/514.35 |
| 8,712,599 B1 | 4/2014 | Westpfahl | |
| 8,914,196 B1 | 12/2014 | Breed et al. | |
| 2002/0075142 A1* | 6/2002 | Foo | B60R 16/0233 340/440 |
| 2002/0087235 A1* | 7/2002 | Aga | B60R 16/0233 701/1 |

(Continued)

FOREIGN PATENT DOCUMENTS

| | | |
|---|---|---|
| JP | 2005-212574 A | 8/2005 |
| KR | 10-2015-0043886 A | 4/2015 |

*Primary Examiner* — Anshul Sood
(74) *Attorney, Agent, or Firm* — Morgan, Lewis & Bockius LLP

(57) ABSTRACT

An airbag firing control system may include an inertial measurement unit (IMU) including a low gravity (G) sensor configured to detect a longitudinal acceleration (ax), a filter configured to convert a first signal detection range of the low G sensor into a second signal detection range and to filter converted output of the low G sensor to generate a first output signal, and an adjuster configured to perform zero-point adjustment on the first output signal transmitted through the filter, and a microcomputer configured to use the first output signal for firing safing when the first output signal satisfies a safing condition as a performing result of the adjuster.

19 Claims, 4 Drawing Sheets

(56) References Cited

U.S. PATENT DOCUMENTS

| | | |
|---|---|---|
| 2004/0036261 A1 | 2/2004 | Breed |
| 2004/0204810 A1* | 10/2004 | Ide ................... B60R 21/0132 |
| | | 701/45 |
| 2010/0191494 A1 | 7/2010 | Yamashita |
| 2012/0139219 A1* | 6/2012 | Mun ................... B60R 21/013 |
| | | 280/735 |
| 2013/0131929 A1 | 5/2013 | Bortolin |
| 2015/0268265 A1 | 9/2015 | Yonezawa et al. |
| 2019/0016286 A1* | 1/2019 | Bartlett ............ B60R 21/01336 |

\* cited by examiner

VEHICLE AIRBAG FIRING CONTROL SYSTEM AND AIRBAG FIRING CONTROL METHOD USING THE SAME

The present application claims priority to Korean Patent Application No. 10-2018-0008704, filed on Jan. 24, 2018, the entire contents of which is incorporated herein for all purposes by this reference.

BACKGROUND OF THE INVENTION

Field of the Invention

The present invention relates to a vehicle, and more particularly, to a firing safing technology used in an airbag firing algorithm using an inertial measurement unit (IMU).

Description of Related Art

An airbag for a vehicle is a device that allows an airbag to momentarily inflate around a vehicle passenger (e.g., steering wheel or instrument panel) during vehicle crash to protect a vehicle passenger from impact and is a representative passenger protection device in addition to a seat belt.

During vehicle crash, when a main impact sensor of an airbag detects crash, an airbag control unit (ACU) may determine whether a crash degree corresponds to airbag deployment and drive an firing device of an inflator (gas generating device). The airbag is deployed using a method in which the firing device is driven, gas is generated as gunpowder explodes, and the generated gas is momentarily injected into an airbag at a high speed to allow the airbag to inflate.

A recent vehicle airbag has a main impact sensor for determining whether a vehicle crashes, an airbag firing algorithm using a safing sensor for preventing malfunction of the main impact sensor, that is, a safing algorithm.

An airbag is ignited only when both the main impact sensor and the safing sensor determine crash using the safing algorithm, preventing malfunction such as sensor error, local impact, and resonance. A vehicle includes an electronic stability control (ESC) system disposed therein for stabilizing a vehicle position by recognizing movement of the vehicle when the vehicle is moved differently from driver intention and separately controlling brakes of vehicle wheels to facilitate maintenance of a direction intended by the driver. The ESC system is referred to as an electronic-type ESC system, an electronic-type stability control system, an electronic control driving stability system, a stability control system, and so on.

An ESC system determines a vehicle state and a road state through a plurality of sensors such as a wheel speed sensor, a brake pressure sensor, a steering angle sensor, a yaw rate sensor, a lateral acceleration sensor, and a longitudinal acceleration sensor and, accordingly, performs rotation, a brake operation of internal and external wheels, and so on to stably control a vehicle position.

Recently, a vehicle in which an inertial measurement unit (IMU) used in an ESC system is integrated into an airbag control unit (ACU) to exchange information has been newly introduced. The IMU may obtain signals of an acceleration sensor and a gyro sensor but, thus far, has not been used for firing sating of an airbag.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle airbag firing control system and an airbag firing control method using the same that substantially obviates one or more problems due to limitations and disadvantages of the related art.

Various aspects of the present invention are directed to providing an airbag firing control system of a vehicle and an airbag firing control method using the system, in which an inertial measurement unit (IMU) integrated into an airbag control unit (ACU) is used as a safing sensor.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

To achieve these objects and other advantages and in accordance for an exemplary embodiment of the present invention, as embodied and broadly described herein, an airbag firing control system of a vehicle may include an inertial measurement unit (IMU) including a low gravity (G) sensor configured to detect a longitudinal acceleration (ax), a filter configured to convert a first signal detection range of the low G sensor into a second signal detection range and to filter converted output of the low G sensor to generate a first output signal, an adjuster configured to perform zero-point adjustment on the first output signal transmitted through the filter, and a microcomputer configured to use the first output signal for firing safing when the first output signal satisfies a safing condition as a performing result of the adjuster.

The filter may include a converter configured to perform conversion into the second signal detection range, and a second low pass filter with a second frequency band.

The first signal detection range may be −5 to +5 g, and the second signal detection range may be −30 to +30 g.

The second frequency band may be equal to or less than 400 Hz.

The adjuster may include an offset cancellation module configured to adjust zero-point offset of the first output signal.

The safing condition may be a state in which a response delay time of the first output signal is within 2 ms and zero-point adjustment is completely performed.

The system may further include a front impact sensor (FIS) disposed in the vehicle, wherein, when zero-point adjustment is not completely performed by the adjuster or the low G sensor malfunctions, a detection signal of the FIS may be used for firing safing.

The FIS may include a left sensor (FIS LH) and a right sensor (FIS RH), and the microcomputer may use a detection signal of a sensor, to which first data is input when crash occurs, for firing safing among sensors of the FIS.

In another aspect of the present invention, an airbag firing control system of a vehicle may include a main impact sensor configured to detect crash of the vehicle, a microcomputer configured to determine whether crash occurs according to a signal detected by the main impact sensor and to control firing of an airbag, an inertial measurement unit (IMU) including a low gravity (G) sensor configured to detect a longitudinal acceleration (ax), a filter configured to extensively convert a first signal detection range of the low G sensor, including a low pass filter configured to filter converted output of the low G sensor and to have a second frequency band, and configured to generate a first output signal, an adjuster configured to perform zero-point adjustment on a first output signal transmitted through the filter, and a front impact sensor (FIS) disposed in the vehicle, wherein the microcomputer utilizes the first output signal for firing safing when the first output signal satisfies a safing condition as a performing result of the adjuster and utilizes an output signal of the FIS for safing when the safing condition is not satisfied.

The FIS may include a left sensor (FIS LH) and a right sensor (FIS RH), and the microcomputer may use a detection signal of a sensor, to which first data is input when crash occurs, for firing safing among sensors of the FIS.

In another aspect of the present invention, an airbag firing control method of a vehicle may include detecting crash by a main impact sensor, determining whether crash occurs based on a crash signal detected by the main impact sensor, converting a first signal detection range of a low gravity (G) sensor of an inertial measurement unit (IMU) into a second signal detection range, filtering output of the low G sensor using a low pass filter with a second frequency band to generate a first output signal, performing offset cancellation for zero-point adjustment of the first output signal, determining whether the first output signal, on which the zero-point adjustment is performed, satisfies a safing condition, and using the first output signal for airbag firing safing when the first output signal satisfies the safing condition in the determining of the safing condition.

The first signal detection range may be −5 to +5 g, and the second signal detection range may be −30 to +30 g.

The second frequency band may be equal to or less than 400 Hz.

The offset cancellation may be performed by an offset cancellation module using software or a zero-point adjustment algorithm.

The safing condition may be satisfied when a time consumed for zero-point adjustment is within a predetermined reference value in the offset cancellation.

The safing condition may be satisfied when a state in which a response delay time of the first output signal is within 2 ms and zero-point adjustment is completely performed is further satisfied.

The method may further include performing auxiliary safing using a detection signal of a front impact sensor (FIS) for safing when zero-point adjustment is completely performed or the low G sensor malfunctions in the determining of the safing condition.

The FIS may include at least one of a left sensor (FIS LH) and a right sensor (FIS RH), and a detection signal of a sensor, to which first data is input when crash occurs, may be used for firing safing among sensors of the FIS.

The performing of the auxiliary safing may further include determining whether the detection signal of the FIS satisfies the safing condition.

The first output signal may be used for safing when the safing condition is satisfied in the determining of the safing condition during the auxiliary safing.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
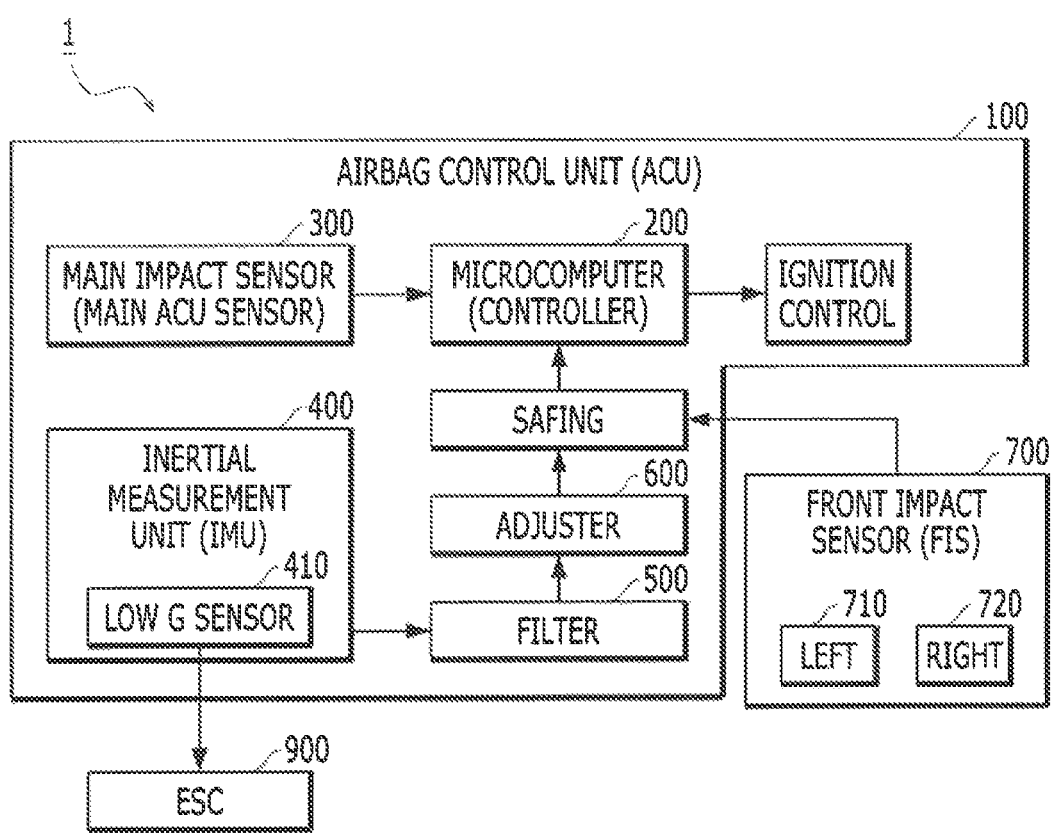
FIG. 1 is a diagram of a structure of an airbag firing control system of a vehicle according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings.

Elements in the following drawings may be exaggerated, omitted, or schematically illustrated for conveniences and clarity of explanation, and the sizes of elements do not reflect their actual sizes completely. Like reference numerals in the drawings denote like elements. In a detailed description of exemplary embodiments of the present invention, the X axis indicates a progress direction (front direction) of a vehicle, the Y axis indicates a direction (lateral direction) orthogonal to the X axis, and the Z axis indicates a direction orthogonal to the XY plane.

Hereinafter, an airbag firing control system of a vehicle according to an exemplary embodiment of the present invention will be described with reference to the accompanying drawings.

Figure 2:
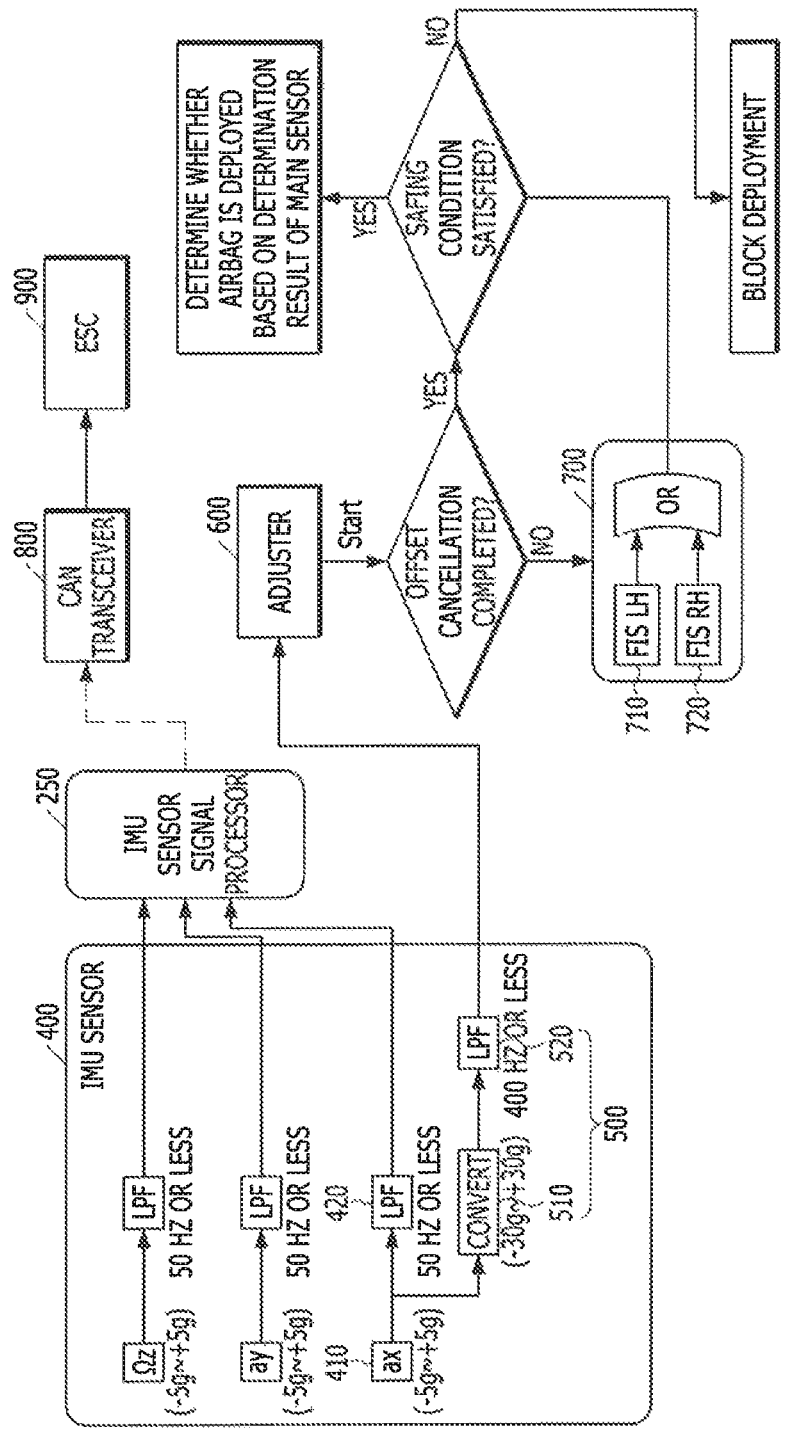
FIG. 2 is a flowchart of an operation of the airbag firing control system of FIG. 1.
Figure 3:
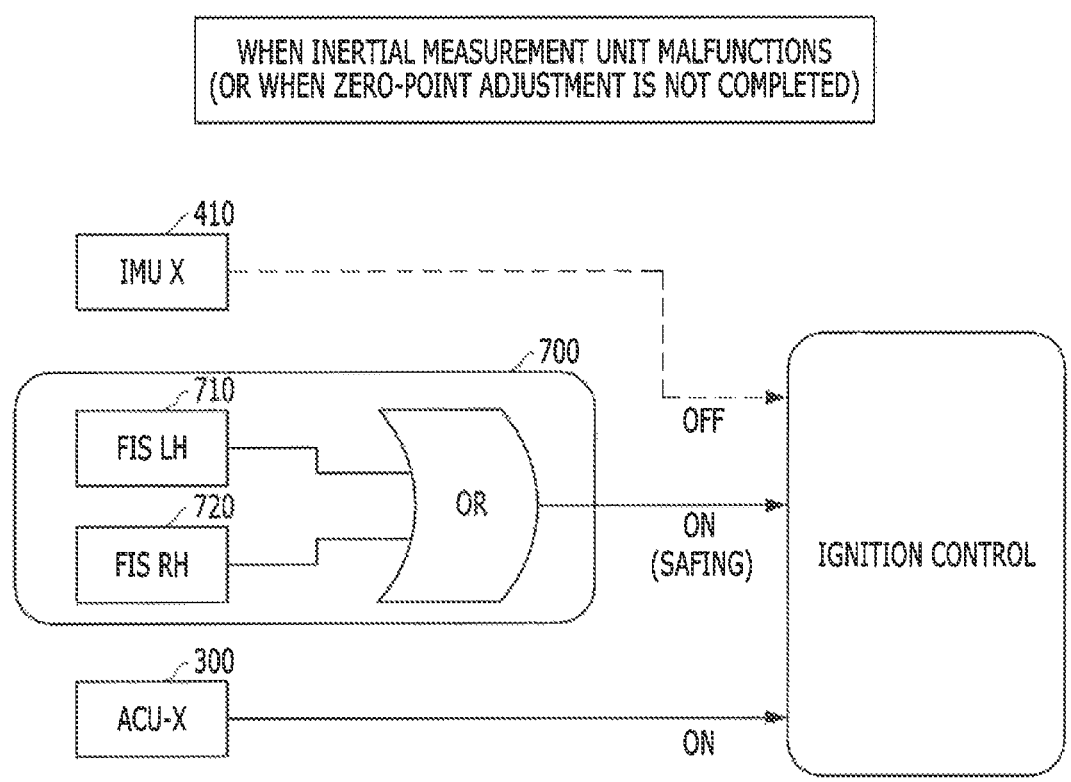
FIG. 3 is a diagram of an operation of an airbag firing control system when an inertial measurement unit (IMU) of FIG. 1 malfunctions or zero-point adjustment is not completed.

FIG. 1 is a diagram of a structure of an airbag firing control system of a vehicle according to an exemplary embodiment of the present invention. FIG. 2 is a flowchart of an operation of the airbag firing control system of FIG. 1. FIG. 3 is a diagram of an operation of an airbag firing control system when an inertial measurement unit (IMU) of FIG. 1 malfunctions or zero-point adjustment is not completed.

As illustrated in FIG. 1 and FIG. 2, an airbag firing control system 1 of a vehicle according to an exemplary embodiment of the present invention may include an airbag control unit (ACU) 100, a microcomputer 200, a main impact sensor 300, an IMU 400, a filter 500, and an adjuster 600.

Hereinafter, for convenience of description, the microcomputer 200 will be exchangeably used with a controller or a control device.

Here, the ACU 100 may include the aforementioned microcomputer 200, the main impact sensor 300, the IMU 400, the filter 500, the adjuster 600, and so on.

The ACU 100 may perform an integration function of detecting collision, determining collision, and transmitting a firing signal to a firing device of an inflator. That is, the ACU 100 may receive impact information detected by the main impact sensor 300, determine whether an airbag is to be deployed, and issue a deployment command according to the determination result. The ACU 100 may use the MU 400 as a sating sensor, which will be described below.

The microcomputer 200 may receive information from various sensors, determine the information, and perform a logic of airbag firing. For example, the microcomputer 200 may lastly determine whether an airbag is ignited based on output of the main impact sensor 300 and the IMU 400 used as a safing sensor and may control whether the airbag is ignited according to the determination result. The microcomputer 200 controls whether the airbag is ignited. The microcomputer 200 may be referred to as a controller.

The main impact sensor 300 may be disposed in the ACU 100 to detect a vehicle collision state. That is, the main impact sensor 300 may determine an acceleration and deceleration value (G value). The main impact sensor 300 may detect x-axis acceleration and y-axis acceleration of a vehicle at normal driving and rapid acceleration to output a sensor value of an electrical signal, and transmit the sensor value to the microcomputer 200.

The sensor value of the main impact sensor 300 may be classified into ACU X as an X-axis sensor value of a vehicle and ACU Y as a Y-axis value. Accordingly, the main impact sensor 300 may also be referred as an ACU main sensor.

The microcomputer 200 may compare the ACU X sensor value and a predetermined X-axis threshold value and compare the ACU Y sensor value and a predetermined Y-axis threshold value. As the comparison result, when the ACU X sensor value is equal to or greater than the X-axis threshold value or the ACU Y sensor value is equal to or greater than the Y-axis threshold value, the microcomputer 200 may lastly determine whether an airbag is deployed based on a comparison result value and a result value of the safing sensor.

The IMU 400 may be included in the ACU 100 and may include a gravity sensor for measuring gravitational acceleration in X and Y-axis directions and a yaw rate sensor for measuring a yaw rate (rotational acceleration) in a z-axis direction, which is a separate element.

The gravity sensor included in the IMU 400 according to the present embodiment may be a low G sensor 410 for measuring acceleration in X and Y-axis directions of a vehicle. The low G sensor 410 may have excellent performance for measuring low force such as impact, vibration, inclination, movement, or acceleration.

An electronic stability control system (ESC) 900 may be a device configured for stabilizing a vehicle position and may control the vehicle position using information measured by the low G sensor 410 of the aforementioned IMU 400.

For example, upon detecting an unstable driving situation based on the information measured by the low G sensor 410, the ESC 900 may transmit data to an engine and brake of a vehicle to automatically maintain control power of the vehicle.

The low G sensor 410 included in the IMU 400 is mainly used to control the ESC 900 but, according to the exemplary embodiment of the present invention, a low G sensor for detecting a longitudinal acceleration (ax) may be used for safing.

That is, a general safing algorithm needs a separate safing sensor (acceleration sensor) with a different sensor from the aforementioned main impact sensor 300 but, according to the exemplary embodiment of the present invention, the low G sensor 410 which is pre-included in the IMU 400 may be used to reduce costs.

A general detecting range, i.e., a signal detection range of the low G sensor 410 may be set to −5 to +5 g and, in the case of resolution, the low G sensor 410 may be used to control the ESC 900 and, thus, may have excellent performance compared with a general safing sensor.

However, it is difficult to use a typical low G sensor 410 for safing of collision detection due to the following characteristics.

First, the main impact sensor 300 or the safing sensor needs to have rapid response speed characteristics for airbag deployment.

However, the low G sensor 410 has a phase delay time of about 20 to about 30 ms. The low G sensor 410 has low signal response characteristics (which has delay compared with raw data by about 30 ms) compared with the main impact sensor 300 within about 2 ms and, thus, it may be difficult to use the low G sensor 410 as a safing sensor.

Second, the main impact sensor 300 or the safing sensor needs to perform zero-point adjustment in real time in an initialization or normal operation to prevent collision or determination error due to zero-point drift which is different from an actual situation.

However, the main impact sensor 300 performs zero-point adjustment as a digital method but, the low G sensor 410 may not perform zero-point adjustment. When the low G sensor 410 performs zero-point adjustment in real time, it may be difficult to detect a dynamic situation of a vehicle and, thus, a sensor itself may not perform zero-point adjustment to operate the ESC 900.

Third, a signal detection range of the low G sensor 410 is −5 to +5 g and, in the instant case, there is a problem in that the signal detection range is too narrow to be used in safing for determining whether an airbag is deployed.

Accordingly, it is difficult to use the low G sensor 410 for safing since the low G sensor 410 has slow signal response characteristics, does not perform zero-point adjustment, and has a narrow signal detection range. However, when the low G sensor 410 has an increased signal detection range and rapid signal response characteristics to perform zero-point adjustment, it may be sufficient to use the low G sensor 410 for safing of collision detection.

Accordingly, according to the exemplary embodiment of the present invention, to use the low G sensor 410 for detecting a longitudinal acceleration (ax) in the case of front crash of a vehicle, a filter 500 may be used to overcome delay of response speed of the low G sensor 410.

The filter 500 may convert a first signal detection range of the low G sensor 410 into a second signal detection range and filter an output signal of the low G sensor 410 to generate a first output signal. Here, the first signal detection range may be −5 to +5 g, which is set to control the ESC 900 and the second signal detection range may be −30 to +30 g, which extends compared with the first signal detection range for safing control.

In more detail, the filter 500 may include a converter 510 and a low pass filter (LPF) 520, as shown in FIG. 2.

The converter 510 may convert the first signal detection range of −5 to +5 g of the low G sensor 410 for detecting longitudinal acceleration (ax) into the second signal detection range of −30 to +30 g.

The second LPF 520 included in the filter 500 may have a second frequency band and may filter an output signal of the low G sensor 410 to generate a first output signal.

Accordingly, the IMU 400 may include a first low pass filter (LPF) 420 for performing low-filtering on an output signal of the low G sensor 410 in a first frequency band and the second LPF 520 for low-filtering on an output signal of the low G sensor 410 in a second frequency band.

Herein, the signal transmitted through the first LPF 420 may be transmitted to a signal processor 250 of the IMU 400.

The second frequency band of the second LPF 520 may be equal to or less than 400 Hz which extends compared with the first frequency band to be used for safing. For reference, the second frequency band used to control the ESC 900 may be equal to or less than 50 Hz.

The filter 500 may map the output signal, i.e. detecting information (raw data) transmitted from the low G sensor 410, to the second signal detection range of −30 to +30 g through the converter 510 and, then, may pass the output signal with the second frequency band through the second LPF 520 to generate a first output signal with overcome response speed delay.

The adjuster 600 may perform zero-point adjustment on the first output signal transmitted through the filter 500. For example, the adjuster 600 may include an offset cancellation module using software or zero-point adjustment algorithm for adjusting zero-point offset of the first output signal.

Offset of sensor data of the output signal transmitted through the filter 500, such as noise components, may remain. Accordingly, the adjuster 600 may completely perform zero-point adjustment through offset cancellation of removing offset from the sensor data to be used for safing.

However, time delay of a maximum of several tens of seconds may occur (compared with a sensor self-supporting method) up to zero-point stabilization whereby sensor data transmitted through the filter 500 has offset of 0.

Accordingly, even if the sensor data of the low G sensor 410 is transmitted through the filter 500, when zero-point adjustment is not performed within a predetermined time through the adjuster 600 or the low G sensor 410 malfunctions, the corresponding sensor data may not be appropriate to be used for safing.

To the present end portion, the microcomputer 200 may determine whether zero-point offset adjustment is completely performed within a predetermined time.

As the determination result, when zero-point offset adjustment is completely performed within the predetermined time, the microcomputer 200 may determine whether corresponding sensor data satisfies a safing condition.

On the other hand, when zero-point offset adjustment is not completely performed within the predetermined time, the microcomputer 200 may determine whether the safing condition is satisfied based on a detection signal of a front impact sensor (FIS) 700. For example, when a response delay time is within 2 ms, the microcomputer 200 may determine that zero-point adjustment is normally completed and a safing condition is satisfied.

Accordingly, when the first output signal of the low G sensor 410 is satisfied, the first output signal may be used in firing safing of an airbag.

When the safing condition is not satisfied, the low G sensor 410 may not be used as a safing sensor and detecting information of the FIS 700 disposed in a vehicle may be temporarily used for safing, as shown in FIG. 1 and FIG. 2.

Sensors of the FIS 700 may be disposed at two right and left sides of a front portion of an engine compartment to detect direct front crash of a vehicle, differently from the main impact sensor 300 of an airbag. The front impact sensor (FIS) 700 may include a left sensor 710 and a right sensor 720 may be a sensor to which first data is input when crash occurs and which is disposed to early determine whether crash occurs and a crash type.

Accordingly, when zero-point adjustment is not completely performed on the first output signal of the low G sensor 410 or the low G sensor 410 malfunctions, a detection signal of the FIS 700 disposed in the vehicle may be used for safing. Furthermore, when zero-point adjustment is performed on a detecting signal of the low G sensor 410, the low G sensor 410 may be used as a safing sensor. The aforementioned control may be performed by the microcomputer (controller) 200.

Accordingly, the vehicle airbag firing control system according to an exemplary embodiment of the present invention is used, an inertial measurement unit (IMU) integrated into an airbag control unit (ACU) may be used as a safing sensor for airbag firing and, thus, a separate safing sensor may not be required to be included in the ACU.

Even if an inertial measurement unit (IMU) (low G sensor) malfunctions or zero-point adjustment is not completely performed, a front impact sensor may be used as a safing sensor to stably control firing.

Hereinafter, an airbag firing control method using the aforementioned vehicle airbag firing control system will be described.

Figure 4:
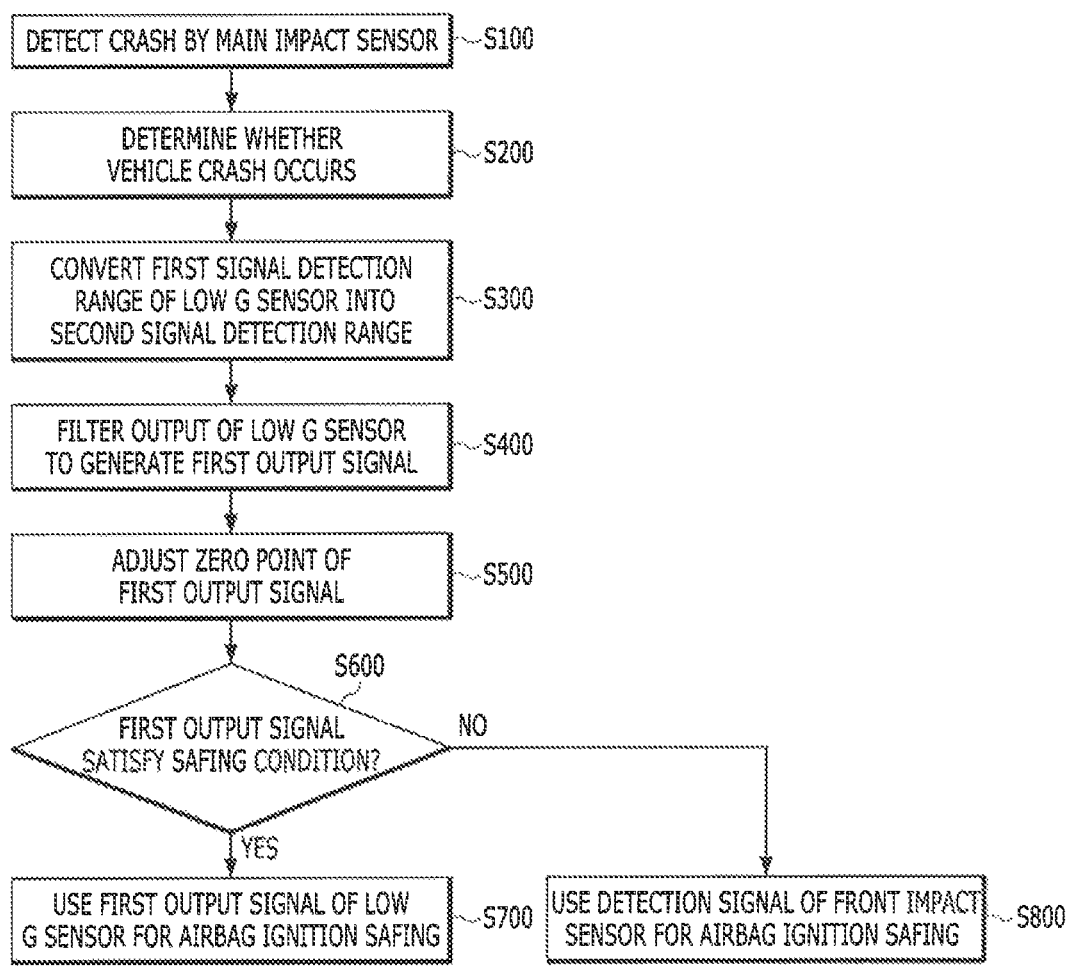
FIG. 4 is a flowchart of an airbag firing control method of a vehicle according to an exemplary embodiment of the present invention.

FIG. 4 is a flowchart of an airbag firing control method of a vehicle according to an exemplary embodiment of the present invention.

Referring to FIG. 4, the main impact sensor 300 detects crash when vehicle crash occurs (S100). Here, the main impact sensor 300 may be an ACU-X sensor which is disposed in the ACU 100 to determine an acceleration and deceleration value (G value) of the vehicle.

Then, whether crash occurs may be determined based on a crash signal detected by the main impact sensor 300 (S200). The main impact sensor 300 may transmit the crash signal to the microcomputer 200 and the microcomputer 200 may determine whether the crash signal is a data value required for airbag firing.

Then, the first signal detection range of the low G sensor 410 may be converted into the second signal detection range to use a signal detected by the low G sensor 410 for detecting longitudinal acceleration (ax) of the IMU 400 as a safing sensor (S300).

Operation S300 may be performed by the converter 510 of the filter 500 and may extensively convert signal information (raw data) transmitted from the low G sensor 410 into the second signal detection range of −30 to +30 g from the first signal detection range of −5 to +5 g.

Output of the low G sensor 410, which is converted into the second signal detection range, may be filtered through the LPF 520 of the converter 510 to generate a first output signal (S400).

The adjuster 600 may perform zero-point adjustment on the first output signal transmitted through the filter 500 through offset cancellation (S500). For example, the adjuster 600 may include an offset cancellation module using software or a zero-point adjustment algorithm for adjusting zero-point offset of the first output signal.

Accordingly, the adjuster 600 may be used for safing by completely performing zero-point adjustment through offset cancellation of removing offset from the sensor data However, time delay of a maximum of several tens of seconds may occur (compared with a sensor self-supporting method) up to zero-point stabilization whereby sensor data transmitted through the filter 500 has offset of 0.

Accordingly, the microcomputer 200 may determine whether zero-point adjustment is completely performed within a predetermined time.

For example, as the determination result, when zero-point offset adjustment is completely performed within the predetermined time, the microcomputer 200 may determine whether corresponding sensor data satisfies a safing condition.

On the other hand, as the determination result, when zero-point offset adjustment is not completely performed within the predetermined time, the microcomputer 200 may determine whether the safing condition is satisfied based on a detection signal of the FIS 700.

Even if the sensor data of the low G sensor 410 is transmitted through the filter 500, when the adjuster 600 detects that zero-point adjustment is not completely performed or the low G sensor 410 malfunctions, output of the low G sensor 410 may not be appropriate for safing.

Accordingly, the microcomputer 200 may determine whether the first output signal of the low G sensor 410 satisfies a safing condition (S410). For example, the safing condition may be satisfied when a time consumed for zero-point adjustment is within a predetermined reference value, a signal response time, i.e., a processing delay time of the first output signal is within 2 ms, and zero-point adjustment is completely performed.

When the safing condition is satisfied, the microcomputer 200 may determine whether an airbag is deployed in consideration of both the output signal of the main impact sensor 300 and the first output signal of the low G sensor 410.

Setting of a safing condition may be different according to a design purpose of one ordinary skill in the art and a safing condition is not particularly limited in an exemplary embodiment of the present invention.

When the first output signal of the low G sensor 410 satisfies the safing condition, the first output signal may be used for safing of airbag firing (S700).

When the safing condition is not satisfied, the low G sensor 410 may not be used as a safing sensor and an auxiliary safing operation in which detecting information of the front impact sensor (FIS) 700 disposed in a vehicle is temporarily used for safing may be performed (S800), as shown in FIG. 1 and FIG. 2.

Accordingly, when zero-point adjustment is not completely performed on the first output signal of the low G sensor 410 or the low G sensor 410 malfunctions, the detection signal of the FIS 700 disposed in the vehicle may be used for safing. Furthermore, while the auxiliary safing operation (S800) is performed, if zero-point adjustment is completely performed on data of the low G sensor 410, the low G sensor 410 may be re-used as a safing sensor. The aforementioned control operations may be performed by the microcomputer (controller) 200.

Accordingly, the vehicle airbag firing control system according to an exemplary embodiment of the present invention is used, an inertial measurement unit (IMU) integrated into an airbag control unit (ACU) may be used as a safing sensor for airbag firing and, thus, a separate safing sensor may not be required to be included in the ACU.

Even if an inertial measurement unit (IMU) (low G sensor) malfunctions or zero-point adjustment is not completely performed, a front impact sensor may be used as a safing sensor to stably control firing.

Accordingly, when an airbag firing control method using the vehicle airbag firing control system according to an exemplary embodiment of the present invention is used, an inertial measurement unit (IMU) integrated into an airbag control unit (ACU) may be used as a safing sensor for airbag firing and, thus, a separate safing sensor may not be required to be included in the ACU.

Even if an inertial measurement unit (IMU) (low G sensor) malfunctions or zero-point adjustment is not completely performed, a front impact sensor may be used as a safing sensor to stably control firing.

When an airbag firing control system of a vehicle and an airbag firing control method using the system according to an exemplary embodiment of the present invention are used, an inertial measurement unit (IMU) integrated into an airbag control unit (ACU) may be used as a safing sensor for airbag firing and, thus, a separate safing sensor may not be required.

Even if an inertial measurement unit (IMU) malfunctions or when zero-point adjustment is not completed, a front impact sensor may be temporarily used for safing.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An airbag firing control system of a vehicle, the system comprising:
    an inertial measurement unit (IMU) including a low gravity (G) sensor configured to detect a longitudinal acceleration (ax) of the vehicle;
    a filter configured to filter an output signal of the low G sensor to convert a first signal detection range of the low G sensor into a second signal detection range;
    an adjuster configured to adjust a zero-point offset on an output signal of the filter; and
    a microcomputer configured to use an output signal of the adjuster for firing safing when the zero-point offset adjustment is completely performed within a first predetermined time,
    wherein the inertial measurement unit (IMU) further includes a first low pass filter (LPF) for low-filtering on the output signal of the low G sensor in a first frequency band,
    wherein the filter includes a converter for performing conversion of the first signal detection range into the second signal detection range wider than the first signal detection range by re-mapping raw data of the output signal of the low G sensor and a second low pass filter (LPF) for low-filtering on the output signal of the low G sensor in a second frequency band, wherein the second frequency band of the second low pass filter (LPF) is higher than the first frequency band of the first low pass filter (LPF), wherein a first signal having the first frequency band outputted through the first low pass filter (LPF) is transmitted to a signal processor of the inertial measurement unit (IMU), wherein a second signal having the second frequency band outputted through the second low pass filter (LPF) is transmitted to the adjuster, and wherein when a processing delay time of the output signal of the adjuster for firing safing is within a second predetermined time, the microcomputer determines whether an airbag is deployed based on the output signal of the adjuster for firing safing.

2. The system according to claim 1, wherein the first signal detection range is −5 to +5 g; and wherein the second signal detection range is −30 to +30 g.

3. The system according to claim 1, wherein the second frequency band is equal to or less than 400 Hz.

4. The system according to claim 1, wherein the adjuster includes an offset cancellation module using software or a zero-point adjustment algorithm for adjusting the zero-point offset on the output signal of the filter.

5. The system according to claim 1, wherein the output signal of the adjuster is used for firing safing when the zero-point adjustment is completely performed within 2 ms by the adjuster.

6. The system according to claim 1, further including a front impact sensor (FIS) disposed in the vehicle, wherein, when the zero-point adjustment is not completely performed within the first predetermined time by the adjuster or the low G sensor malfunctions, a detection signal of the FIS is used for firing safing.

7. The system according to claim 6, wherein the FIS includes a first sensor and a second sensor; and wherein the microcomputer utilizes a detection signal of a sensor that sends a first input signal among the first and second sensors when a crash occurs, for firing safing among sensors of the FIS.

8. An airbag firing control system of a vehicle, the system comprising:

a main impact sensor configured to detect a crash of the vehicle;

a microcomputer configured to determine whether the crash occurs according to a signal detected by the main impact sensor and to control firing of an airbag;

an inertial measurement unit (IMU) including a low gravity (G) sensor configured to detect a longitudinal acceleration (ax) of the vehicle;

a filter configured to filter an output signal of the low G sensor to convert a first signal detection range of the low G sensor into a second signal detection range;

an adjuster configured to adjust zero-point offset on an output signal of the filter;

a front impact sensor (FIS) disposed in the vehicle, wherein the microcomputer utilizes an output signal of the adjuster for firing safing when the zero-point offset adjustment is completely performed within a first predetermined time by the adjuster and utilizes an output signal of the FIS for safing when the zero-point offset adjustment is not completely performed within the first predetermined time by the adjuster, wherein the inertial measurement unit (IMU) further includes a first low pass filter (LPF) for low-filtering on the output signal of the low G sensor in a first frequency band, wherein the filter includes a converter for performing conversion of the first signal detection range into the second signal detection range wider than the first signal detection range by re-mapping raw data of the output signal of the low G sensor and a second low pass filter (LPF) for low-filtering on the output signal of the low G sensor in a second frequency band, wherein the second frequency band of the second low pass filter (LPF) is higher than the first frequency band of the first low pass filter (LPF), wherein a first signal having the first frequency band outputted through the first low pass filter (LPF) is transmitted to a signal processor of the inertial measurement unit (IMU), wherein a second signal having the second frequency band outputted through the second low pass filter (LPF) is transmitted to the adjuster, and wherein when a processing delay time of the output signal of the adjuster for firing safing is within a second predetermined time, the microcomputer determines whether an airbag is deployed based on the output signal of the adjuster for firing safing.

9. The system according to claim 8, wherein the FIS includes a first sensor and a second sensor; and wherein the microcomputer utilizes a detection signal of a sensor that sends the first input signal among the first and second sensors when the crash occurs, for firing safing among sensors of the FIS.

10. An airbag firing control method of a vehicle including a main impact sensor, a microcomputer, an inertial measurement unit (IMU) having a low gravity (G) sensor, a filter and an adjuster, the method comprising:

detecting a crash by the main impact sensor;

determining whether the crash occurs based on a crash signal detected by the main impact sensor;

filtering an output signal of the low G sensor to convert a first signal detection range of the low G sensor into a second signal detection range through the filter;

adjusting zero-point offset on an output signal of the filter through the adjuster; and determining whether the zero-point offset adjustment is completely performed within a first predetermined time by the microcomputer; and using an output signal of the adjuster for firing safing when the zero-point offset adjustment is completely performed within the first predetermined time, wherein the inertial measurement unit (IMU) includes a first low pass filter (LPF) for low-filtering on the output signal of the low G sensor in a first frequency band, wherein the filter includes a converter for performing conversion of the first signal detection range into the second signal detection range wider than the first signal detection range and a second low pass filter (LPF) for low-filtering on the output signal of the low G sensor in a second frequency band, wherein the second frequency band of the second low pass filter (LPF) is higher than the first frequency band of the first low pass filter (LPF), wherein a first signal having the first frequency band outputted through the first low pass filter (LPF) is transmitted to a signal processor of the inertial measurement unit (IMU), wherein a second signal having the second frequency band outputted through the second low pass filter (LPF) is transmitted to the adjuster, and wherein when a processing delay time of the output signal of the adjuster for firing safing is within a second predetermined time, the microcomputer determines whether an airbag is deployed based on the output signal of the adjuster for firing safing.

11. The method according to claim 10, wherein the first signal detection range is −5 to +5 g; and wherein the second signal detection range is −30 to +30 g.

12. The method according to claim 10, wherein the second frequency band is equal to or less than 400 Hz.

13. The method according to claim 10, wherein the adjusting zero-point offset is performed by an offset cancellation module using software or a zero-point adjustment algorithm.

14. The method according to claim 10, wherein the output signal of the adjuster is used for firing safing when the zero-point offset adjustment is completely performed within the first predetermined time.

15. The method according to claim 14, wherein the first predetermined time is 2 ms.

16. The method according to claim 10, further including:
performing auxiliary safing using a detection signal of a front impact sensor (FIS) for safing when the zero-point adjustment is not completely performed or the low G sensor malfunctions in the determining whether the zero-point offset adjustment is completely performed.

17. The method according to claim 16, wherein the FIS includes at least one of a first sensor and a second sensor; and wherein a detection signal of a sensor that sends the first input signal among the first and second sensors when the crash occurs, is used for firing safing among sensors of the FIS.

18. The method according to claim 17, wherein the performing of the auxiliary safing further includes determining whether the detection signal of the FIS satisfies a safing condition.

19. The method according to claim 18,
wherein the output signal of the adjuster is used for safing when the safing condition is satisfied during the auxiliary safing.

* * * * *